United States Patent [19]

Kastanis

[11] Patent Number: 4,929,016
[45] Date of Patent: May 29, 1990

[54] BI-DIRECTIONAL ROOF MOUNTED CAR PROTECTIVE DEVICE

[76] Inventor: Paraskevas N. Kastanis, 6009 Woodbridge Rd., Charlotte, N.C. 28212

[21] Appl. No.: 320,510

[22] Filed: Mar. 8, 1989

[51] Int. Cl.$^5$ ............................................... B60J 7/20
[52] U.S. Cl. ................................... 296/136; 296/95.1
[58] Field of Search .......................... 296/136, 95.1, 98

[56] References Cited

U.S. PATENT DOCUMENTS

| 3,050,075 | 8/1962 | Kaplan et al. | 296/136 |
| 4,684,165 | 8/1987 | Becker | 296/136 |

FOREIGN PATENT DOCUMENTS

| 58233 | 10/1967 | Fed. Rep. of Germany | 296/136 |
| 2177359 | 1/1987 | United Kingdom | 296/136 |

Primary Examiner—Robert R. Song
Attorney, Agent, or Firm—Shefte, Pinckney & Sawyer

[57] ABSTRACT

A protective covering for a vehicle is selectively mountable on an exterior surface of a vehicle. The protective covering includes a pair of extendable and retractable, flexible, sheet-like covering means movable between a full extended position for covering a selected portion of the vehicle and a retracted position for storage. Each covering means is coupled to a means for winding the covering means about an axis and a housing supports the pair of winding means relative to one another such that the winding means are closely adjacent and their winding axes are in substantially parallel relation to one another. Means are provided for selectively securing the housing to an exterior surface of the vehicle and for selectively securing the covering means in their extended positions, to the vehicle to be covered.

5 Claims, 2 Drawing Sheets

BI-DIRECTIONAL ROOF MOUNTED CAR PROTECTIVE DEVICE

BACKGROUND OF THE INVENTION

The present invention relates to a protective covering for a vehicle and, more particularly, to a protective cover selectively mountable on an exterior surface of a vehicle.

Protective covers for vehicles such as automobiles or the like have been proposed and one type of protective cover includes a typically water-resistant sheet selectively unwindable from a roller assembly to cover a vehicle. For example, in U.S. Pat. No. 4,657,298 to Yong O, a vehicle protective cover is disclosed in which a container is mounted in the truck of the vehicle and a sheet material is selectively unwindable from the container to overlie portions of the vehicle lying between the container and the front end of the vehicle. However, the arrangement of Yong O requires alteration of the vehicle in the area of its trunk in order to adapt it to vehicles since sufficient space and accessibility must be present install the sheet material container in the vehicle trunk. Aside from the difficulties in installing the sheet material container in a vehicle, the Yong O apparatus presents other drawbacks such as the drawback that a portion of the vehicle remains exposed to harmful or deleterious weather elements.

Accordingly, the need exists for a vehicle cover which is easily adaptable to a vehicle. Furthermore, the need exists for a vehicle protective cover which can protect substantially the entire vehicle from vertically downwardly directed weather elements such as rain, snow and sun rays.

SUMMARY OF THE INVENTION

The present invention provides a vehicle protective cover which is easily adaptable to a vehicle. Moreover, the vehicle protective cover of the present invention protects substantially the entire vehicle from vertically downwardly directed weather elements such as rain, snow and sun rays. The vehicle protective cover is easily adaptable to a vehicle without alteration of the vehicle itself.

Briefly described, the present invention provides an apparatus for covering selected portions of a vehicle. The apparatus includes a pair of extendable and retractable, flexible, sheet-like covering means, each covering means having a lateral extent corresponding generally to the lateral extent of a vehicle on which the cover is to be used and a pair of covering means having a combined longitudinal extent corresponding generally to the longitudinal extent of the selected portion of the vehicle to be covered. A pair of means, each coupled to a respective one of the covering means, is provided for winding the covering means about an axis. Additionally, the apparatus includes a housing for supporting the pair of winding means relative to one another such that they are closely adjacent and their winding axes are in substantially parallel relation to one another, means, connected to the housing, for selectively securing the housing to an exterior surface of the vehicle and means, connected to the covering means, for selectively securing the covering means to the vehicle.

Preferably, each winding means includes a roller and the covering means associated with each roller has an edge connected to the roller. Preferably, the means for selectively securing the covering means in its first, fully extended position to the vehicle includes a plurality of straps secured to each covering means adjacent a respective edge thereof, and a suction device connected to each strap for engaging the vehicle.

Other advantages and features of the present invention will be apparent from the accompanying drawings and following detailed description of the preferred embodiment.

DETAILED DESCRIPTION OF THE PREFERRED EMBODIMENTS

Figure 1:
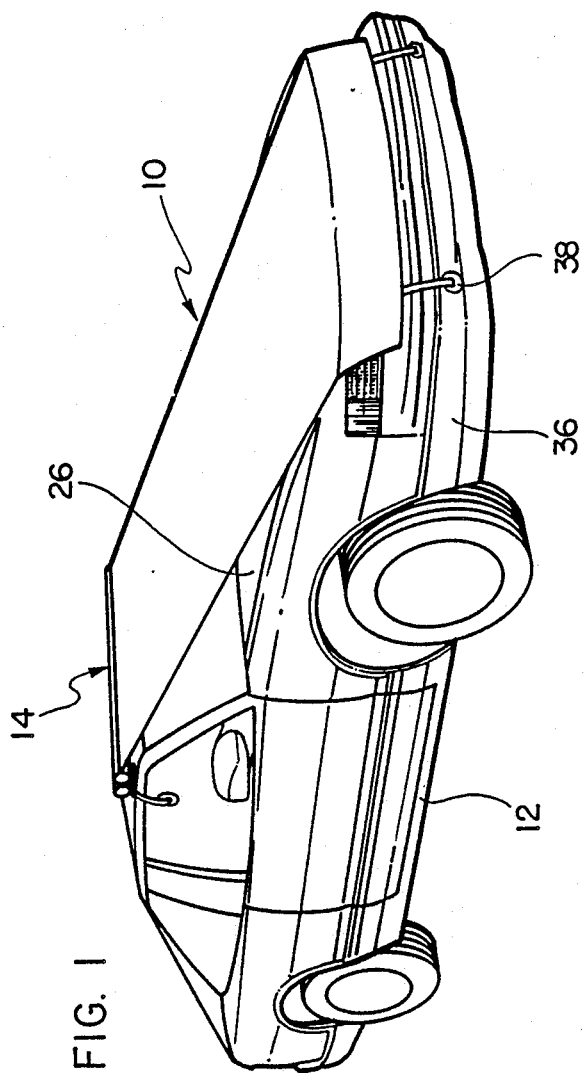
FIG. 1 is a perspective view of one embodiment of the protective cover apparatus of the present invention, shown mounted on a vehicle and deployed to cover the vehicle.
Figure 2:
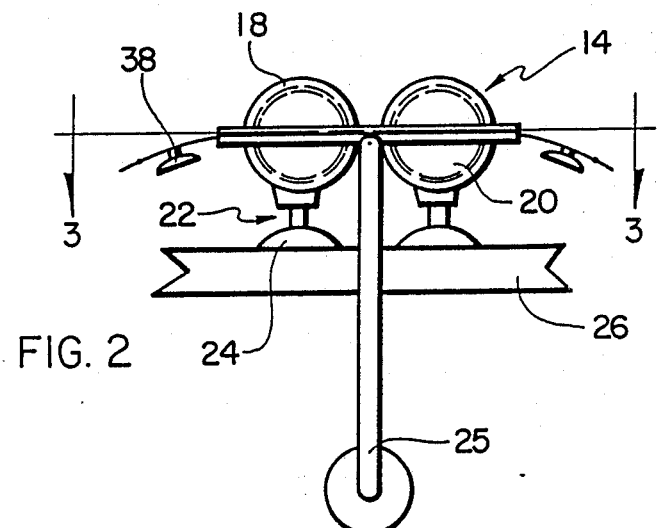
FIG. 2 is a side elevational view of the protective covering apparatus of FIG. 1 in its retracted condition.
Figure 3:
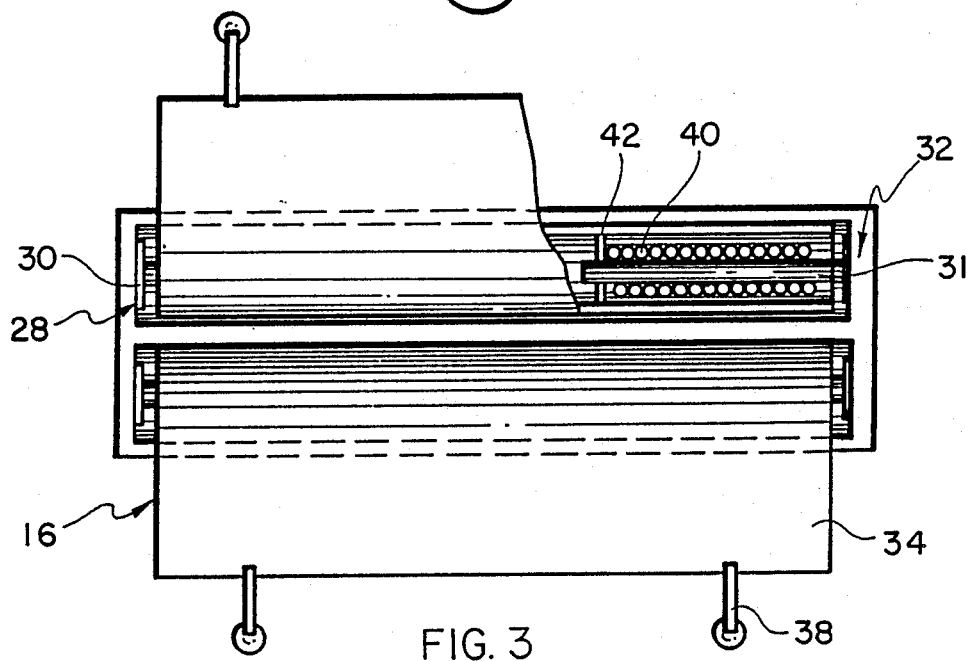
FIG. 3 is a horizontal sectional view of the protective cover apparatus shown in FIG. 2, taken along line II—II in FIG. 2, showing the pair of covering sheets substantially fully retracted to their respective storage positions within the housing of the protective cover apparatus and showing one of the covering sheets in partial section to reveal the means for winding the covering sheet into the housing.
Figure 4:
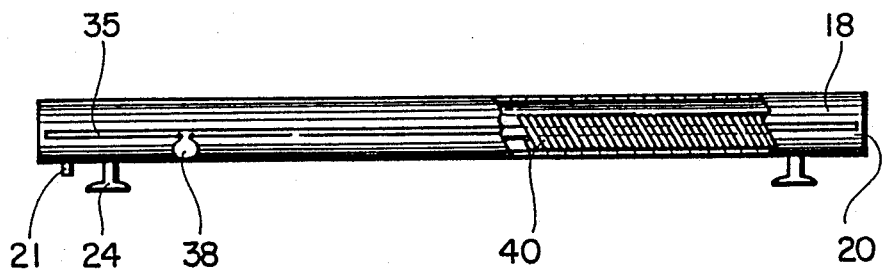
FIG. 4 is a front elevation view of the apparatus shown in FIGS. 2 and 3.

In FIGS. 1–4, one embodiment of the protective cover apparatus of the present invention, generally designated as 10, is shown as it would be deployed on a vehicle such as a car 12. The protective apparatus 10 includes a housing 14 for supporting and storing a pair of covering assemblies 16.

The housing 14 includes an upper shell 18 and a lower shell 20 compatibly configured to provide an enclosure for the covering assemblies 16 when disposed in oppositely facing, superposed relation to one another. The two shells provide a generally water-resistant, self-supporting enclosure for the covering assemblies 16. The upper shell 18 and the lower shell 20 each include a pair of elongate, semi-cylindrical portions which, together with the respective superposed semi-cylindrical portion of the other shell, forms a generally cylindrical enclosure, each enclosure housing one of the covering assemblies 16. Additionally, each of the two semi-cylindrical elongate portions of the lower shell 20 has a drainage conduit 21, for selective drainage of moisture collected therein, and a pair of mounting legs 22 connected thereto, each mounting leg 22 being adjacent a respective axial end of the elongate semi-cylindrical portion. Each mounting leg 22 has a suction foot 24 attached to its free end to secure the housing 14 to an exterior surface 26 of the car 12.

In lieu of the suction feet 24, the mounting legs 22 can be provided with suitable padded footing or other non-surface engaging footing which support the housing 14 on the roof 26 without positively engaging the roof by suction or other gripping action. The padded footing of the mounting legs 22 support the housing 14 on the roof 26 while a pair of elongate straps 25, each having a suction foot identical to the suction feet 24, secure the housing to opposite side windows of the car 12. Each strap 25 is fastened to the housing 14 at a respective end thereof and has a length sufficient to extend below the roof 26 so that its suction foot is adjacent a side window.

Each covering assembly 16 includes a winding means 28 having a roller 30 and a spring assembly 32 for urging the roller 30 to rotate about its longitudinal axis in a given clockwise or counterclockwise direction. Each roller 30 is rotatably supported on a pair of oppositely directed, spaced rods 31 fixedly mounted to one of the semi-cylindrical portions of the lower shell 20 such that the longitudinal axis of the roller is parallel to the axis of the semi-cylindrical portion. A covering sheet 34 has one lateral edge portion connected to the roller 30 such that the lateral edge portion is aligned parallel to the axis of the roller 30. The winding means 28 is actuable to selectively wind the covering sheet on the roller 30 and to permit the covering sheet to be unwound therefrom for deployment in superposed relation over the exterior surface 26 of the car 12.

The cross sectional diameter of each covering sheet 34, when fully wound on its associated roller 30, is slightly less than the inner diameter of the respective aligned pair of superposed semi-cylindrical portions of the upper shell 18 and the lower shell 20 which together form the enclosure for the covering assemblies 16. The upper shell 18 and the lower shell 20 define a pair of slots 35 therebetween along opposing longitudinal edge portions of the housing 14. Each slot permits passage therethrough of one of the covering sheets 34 as it is deployed between its fully wound position and its deployed unwound position. Thus, each covering sheet 34 is completely enclosed within one of the cylindrical interior portions formed by the upper shell 18 and the lower shell 20.

Each covering sheet 34 is a generally rectangular sheet of waterproof material such as a plastic or canvas material and is preferably opaque or otherwise light impeding. The widthwise extent of the sheet is approximately equal to the widthwise extent of the car 12 while the lengthwise extent of the sheet is approximately slightly greater than one half the straight line distance from approximately the midpoint of the car 12 measured from its uppermost exterior surface such as, for example, its roof, to the most remote of its front and back bumpers 36. Thus, the covering sheets 34 sufficiently extend over the car roof and the front and rear ends of the car to offer protection thereto from generally vertically directed weather elements such as rain and sunshine. Moreover, the lateral edge portion of each covering sheet 34 which is not connected to the roller 30 is provided with a pair of spaced attachment means 38 for securing the sheet to one of the bumpers 36.

Each spring assembly 32 includes a coil spring 40 coaxial with, and mounted interiorly of, the respective associated roller 30 and in an encircling relation with one of the rods 31. A cross bar 42 mounted to the free axial end portion of the encircled rod 31 is connected to one end of the coil spring 40. The other free end of the coil spring 40 is connected to the associated roller 30. Accordingly, the coil spring 40 urges its associated roller 30 to rotate in a given clockwise or counterclockwise direction in a manner similar to the operation of a roller shade on a window. In its storage mode, both covering sheets 34 of the apparatus are fully wound around their respective rollers 30, whereby the covering sheets are enclosed within the cylindrical interior portions of the housing 14, save for the attachment means 38 which remain outside of the housing.

As can be understood, the vehicle protective apparatus of the present invention is a self-contained, portable unit which is easily lifted and maneuvered by one person. The user can conveniently store the apparatus in the trunk of the vehicle or in another location such as, for example, a garage, and then readily deploy the apparatus to cover the vehicle. If the user desired to deploy the covering sheets 34 of the apparatus 10 to their fully extended position so as to protect a vehicle, the user can easily transfer the apparatus 10 from its storage position in the vehicle trunk or the garage to the exterior surface 26 of the vehicle.

Once the user has removed the apparatus 10 from the storage position, the user simply positions the apparatus on the exterior surface 26 and, preferably, the roof of the vehicle, such that the axes of the rollers 30 are generally perpendicular to the lengthwise extent of the vehicle. Then, the user applies a slight downward pressure to the housing 14 to cause the suction feet 24 to engage the roof of the vehicle and thereby secure the apparatus 10 to the vehicle roof. Thereafter, the user unwinds one of the covering sheets 34 by applying a pulling force to the sheet to pull it through the associated slot in the housing 14 and unwinds it from its roller 30. When the covering sheet 34 has been sufficiently extended, the associated attachment means 38 are secured to the vehicle bumper 36. If desired, the attachment means 38 can include suction structures similar to the suction feet 24, whereby the user need only apply a slight pressure to press the attachment means 38 into engagement with the adjacent surface of the vehicle. The user then extends the other covering sheet 34 in a similar manner and secures that covering sheet, via its attachment means 38, to the vehicle. So deployed, the protective apparatus 10 protects substantially the entire vehicle from downwardly directed weather elements such as rain, snow and sun rays.

If the user desires to drive or otherwise operate the vehicle, the protective apparatus 10 must accordingly be removed from the vehicle roof and, to do so, the user need only disengage the attachment means 38 of each covering sheet 34 from the vehicle and actuate the winding assemblies 28 to wind the covering sheets 34 into the housing 14. Due to the biasing actions of the spring assemblies 32, the user can easily initiate the winding process by merely applying an unwinding force of short duration to the covering sheet and then releasing the cover sheet, whereupon the covering sheet, under the action of the winding assembly 28 connected thereto, will be wound upon itself until it is fully enclosed within the housing 14. When both covering sheets 34 have been rewound, the user merely disengages the suction feet 24 from the vehicle roof by, for example, applying a slight rocking motion to the apparatus 10 and the apparatus is then ready for transfer to its storage position.

As can be understood, the apparatus 10 can be readily adapted to all types of vehicles without the need for removing, altering or otherwise disturbing the vehicle itself. Moreover, the protective apparatus 10 offers benefits from an aesthetic and maintenance standpoint since it is removable from the vehicle when not in use to be stored in an out-of-sight location such as the vehicle trunk.

In addition to its advantageous use as a protective cover for a vehicle, the apparatus 10 can be readily adapted for other uses. For example, the protective cover can be used as a tent-like structure by mounting, for example, the apparatus 10 on the roof of a vehicle such that one or both covering sheets 34 can be unrolled in the direction of the side of the vehicle. Once extended, the free end of the covering sheet 34 can be supported, for example, by poles to form a tent-like structure. As another example, the apparatus 10 can be used as a covering for a wood pile by placing the housing 14 on top of the wood pile, generally at the longitudinal center of the pile, and extending the covering sheets 34 to cover the pile.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. An apparatus for covering selected portions of a vehicle, comprising:

a pair of extendable and retractable, flexible, sheet-like covering means, each covering means having a lateral extent corresponding generally to the lateral extent of a vehicle on which the cover is to be used, and the pair of covering means having a combined longitudinal extent corresponding generally to the longitudinal extent of the selected portion of the vehicle to be covered, each covering means being movable between a first, fully extended position for covering the selected portion of the vehicle and a second, retracted position for storage;

a pair of means, each coupled to a respective one of the covering means, for winding the covering means about an axis;

a housing for supporting the pair of winding means relative to one another such that they are closely adjacent and their winding axes are in substantially parallel relation to one another;

means, connected to the housing, for selectively securing the housing to an exterior surface of the vehicle, said means including a plurality of suction devices for engaging opposite side windows of the vehicle; and means, connected to said covering means, for selectively securing said covering means in extended covering relation to the vehicle.

2. An apparatus according to claim 1 and characterized further in that each winding means includes a roller and the covering means associated with each roller has an edge connected to the roller.

3. An apparatus according to claim 2 and characterized further by a spring assembly associated with each roller for urging the roller to rotate about its longitudinal axis in a covering means winding direction.

4. An apparatus according to claim 1 and characterized further in that said means for selectively securing the covering means, in its first, fully extended position, to the vehicle includes a plurality of straps secured to each covering means adjacent a respective edge thereof, and a suction device connected to each strap for engaging the vehicle, said means for selectively securing the covering means cooperating with said means for selective securing the housing to secure the fully extended covering means to the vehicle.

5. An apparatus according to claim 1 and characterized further in that the covering means is made of a water resistant material.

* * * * *

UNITED STATES PATENT AND TRADEMARK OFFICE
CERTIFICATE OF CORRECTION

PATENT NO. : 4,929,016

DATED : May 29, 1990

INVENTOR(S) : Paraskevas N. Kastanis

It is certified that error appears in the above-identified patent and that said Letters Patent is hereby corrected as shown below:

Column 1, Line 16, delete "truck" and insert therefor -- trunk --.

Column 1, Line 23, after "present" add -- to -- .

Column 2, Line 26, delete "elevation" and insert therefor -- elevational --.

Column 4, Line 5, delete "desired" and insert therefor -- desires --.

Column 4, Line 25, delete "bump 36" and insert therefor -- bumper 36 --.

Column 6, Line 35, delete "selective" and insert therefor -- selectively --.

Signed and Sealed this

Sixteenth Day of June, 1992

Attest:

DOUGLAS B. COMER

*Attesting Officer*      Acting Commissioner of Patents and Trademarks